United States Patent [19]
Arai et al.

[11] Patent Number: 5,818,809
[45] Date of Patent: Oct. 6, 1998

[54] OPTICAL SYSTEM FOR RECORDING AND/OR REPRODUCING AN OPTICAL INFORMATION RECORDING MEDIUM

[75] Inventors: Norikazu Arai; Masaya Kobayashi, both of Hachioji, Japan

[73] Assignee: Konica Corporation, Tokyo, Japan

[21] Appl. No.: 824,846

[22] Filed: Mar. 26, 1997

[30] Foreign Application Priority Data

Apr. 3, 1996 [JP] Japan ..................... 8-106358

[51] Int. Cl.$^6$ .................................................. G11B 7/135
[52] U.S. Cl. ................................ 369/118; 369/112
[58] Field of Search .................... 369/118, 112; 359/717, 794, 368, 795

[56] References Cited

U.S. PATENT DOCUMENTS 5,475,537  12/1995  Kobayashi et al. .................. 359/794

*Primary Examiner*—Tod R. Swann
*Assistant Examiner*—Kim-Kwok Chu
*Attorney, Agent, or Firm*—Finnegan, Henderson, Farabow, Garrett & Dunner, L.L.P.

[57] ABSTRACT

An optical system for recording or reproducing information in an optical information recording medium, includes: a light source having a wavelength $\lambda$ thereof; an objective lens; tracking device for tracking the objective lens by moving the objective lens in a direction perpendicular to an optical axis of the optical system; and a coupling lens optical system including at least one plastic lens and having a positive focal length, and being provided between the light source and the objective lens for guiding a light emitted from the light source to the objective lens. A maximum amount of change in a wavefront aberration of the coupling lens optical system in a numerical aperture corresponding to a maximum amount of tracking is 0.02 $\lambda$rms or less.

15 Claims, 13 Drawing Sheets

OPTICAL SYSTEM FOR RECORDING AND/OR REPRODUCING AN OPTICAL INFORMATION RECORDING MEDIUM

BACKGROUND OF THE INVENTION

The present invention relates to an optical system in which light beams from a light source are collected on an optical information recording surface to record and reproduce information on its surface, and specifically, to an optical system in which influence by changes in temperature and humidity is suppressed.

Various optical systems have been proposed for a converging optical system in which divergent light beams emitted from a light source are converted into converging light beams and image-focused on an optical information recording medium in order to record/reproduce information on a compact disk (CD), which is the most popular type of optical information medium. A finite conjugation type optical system is common, in which a semiconductor laser having an oscillation wavelength of approximately 780 nm is used, and a single objective lens is used, in which the numerical aperture on the optical information recording medium side is approximately 0.45, and both surfaces of which are aspherical, (refer to, for example, Japanese Patent Publication Open to Public Inspection No. 56314/1986). In many cases, the single objective lens is composed of resin, and its change due to temperature has not been a problem because of the relatively small focusing distance and numerical aperture. Regarding also change due to humidity, even when resin having a saturated water absorption ratio of approximately 1 to 2%, was used, there has been no problem.

Recently, however, increased density of information recording onto an optical information recording medium such as optical disks, is advanced, and accompanying this, a reduction of wavelengths of the light source, and consequently a large increase of the NA of optical systems or objective lenses are promoted. Specifically, for DVD, an extreme increase of densities is advancing, and a wavelength of 635–650 nm and a numerical aperture of 0.6 are required for a converging light optical system.

In order to record/reproduce such a high density optical information recording medium, a finite conjugation type optical system, composed of a single objective lens, is not available because spherical aberration is largely changed when the lens is moved for focusing due to the large numerical aperture of the objective lens; and further, because much astigmatism is generated when the lens is moved in the direction perpendicular to the optical axis for tracking.

In a system in which the light source and the objective lens are integrally moved for focusing and tracking, there is no fluctuation of aberration, however, the speed necessary for tracking or focusing can not be obtained by a simple mechanism.

For these reasons, use of an optical system, composed of a light source, a coupling optical system and an objective lens, is necessary so that the objective lens is moved for focusing and tracking, and fluctuation of aberration caused by this movement is greatly suppressed, and thereby, an absolute value of a lateral magnification of the objective lens can also be limited to less than a predetermined value.

Generally, as a coupling optical system, a collimator optical system is used to convert divergent light beams into parallel light beams. In this case, the lateral magnification mc of the coupling optical system is zero, when viewed from the opposite side of the light source.

As the collimator optical system, generally, a collimator lens of 1 group including 2 elements is used, in which spherical glass surfaces are adhered to each other, and recently, a single aspherical glass lens is also used. Further, as a portion of the collimator optical system, a single aspherical resin lens is also used.

Further, various types of collimator optical systems are also known which are composed of single lenses having more than 3 elements, in which a positive lens made of low-dispersion material is combined with a negative lens made of high-dispersion material, in order to reduce influence due to fluctuations of the wavelength of semiconductor lasers.

Examples are disclosed in Japanese Patent Publication Open to Public Inspection Nos. 258573/1994 and 5909/1996, in which the divergence degree of a divergent light beam, emitted from the light source, is reduced, and a lateral magnification of the objective lens is set to a negative value, which is close to zero, by using a coupling optical system in which a lateral magnification mc, viewed from the opposite side of the light source, is positive.

In the latter example, a double-sided aspherical resin lens is considered as the objective lens, and a single resin lens, at least one surface of which is aspherical, is considered as the coupling optical system.

In either example, counter measures to encounter a spherical aberration, which is a problem generated when the NA of the optical system and objective lens is increased, and which is generated by changes of the environmental temperature and is varied by focusing, are described in cases where the objective lens is made of resin.

In this connection, an example is disclosed in Japanese Patent Application No. 352208/1995, in which a coupling lens having a negative lateral magnification mc, when viewed from the opposite side of the light source, is used, and thereby, divergent light beams emitted from the light source are converted into converging light beams, and the lateral magnification of the objective lens is set to a value which is positive and close to zero.

In this publication, conditions are described, which reduce the spherical aberration generated by changes of environmental temperature, to a degree which causes almost no problem even if the objective lens is made of resin, with respect to a reduction of the wavelength of the light source, and an increase of the NA of the optical system or the objective lens, which are required for the optical system to record/reproduce an extremely high dense optical information recording medium, such as a DVD. Further, the following is described: as the coupling optical system, a single resin lens is used, and thereby, the spherical aberration generated by changes of the environmental temperature can further be reduced.

However, in the above examples, no countermeasure to overcome problems generated by changes of ambient humidity is disclosed, when the lens is made of resin, and therefore, it is not clear whether the optical system can allow humidity changes while recording/reproducing the highly dense optical information recording media, such as DVDs.

Incidentally, an optical system is known which is composed of a glass lens and a plastic lens having a refractive power of approximately zero, as a collimator lens to convert the emitted light beams from a semiconductor laser into parallel light beams, which is used for an optical system for an optical disk, so that a lens having excellent heat and humidity resistant performance can be provided (Japanese Patent Publication Open to Public Inspection Nos. 20377/1995 and 20378/1995). In the descriptions of the publications:

(1) There is a problem in which, when a collimator lens in an infinite conjugation type optical system is composed of plastic, the focal length and the back focal length fluctuate greatly by changes of the refractive index caused by temperature change, and the position of the light source is out of the focus position for the lens, so that emitted light beams are not parallel, and thereby, the optical performance is deteriorated.

(2) As an effect of the invention, a lens can be obtained in which the focal length and the back focal length change only slightly when the refractive index of the plastic lens changes. Accordingly, fluctuation of the focal length is small with respect to temperature change, so that this lens can be used when heat resistant performance is required. Further, regarding also a change of humidity, the refractive index of the lens is changed base on the humidity absorption, however, the change of focal length of the lens is small with respect to this refractive index, and this lens also has humidity resistant characteristics.

In the above item (1), when only a single plastic collimator lens is considered, it is a fact that the focal length and the back focal length are changed with a change of the refractive index due to temperature change. However, in the whole optical system for recording/reproducing an optical information recording medium, which is composed of a light source, a single plastic collimator lens, and an infinite conjugation type objective lens, even if the emitted light beams from the collimator lens are not parallel caused by a change of the refractive index due to temperature change, the fluctuation of the spherical aberration is small.

Incidentally, in the above optical system, the objective resin lens has positive spherical aberration because the refractive index of resin materials decreases when the ambient temperature rises. On the other hand, in the single collimator resin lens, the spherical aberration generated in the single collimator lens is small when the refractive index of the resin material decreases due to temperature rise, and as an influence of the temperature rise, emitted light beams from the single collimator lens become divergent light beams because the back focal length is greater. Incidentally, in the objective lens, negative spherical aberration is generated when the divergent light beam enters into the lens. Accordingly, the collimator lens is composed of a single resin lens, and thereby, the change of the spherical aberration due to a change of the ambient temperature in the objective resin lens, is corrected.

Further, in the item (2) above, it is a fact that a change of the focal length and back focal length is decreased by causing the refractive index of the plastic lens to be approximately zero when the whole lens is uniformly under dehumidified or humidified condition. However, in a moisture absorption process following the uniform dehumidifying condition, or in a dehumidifying process following the uniform moisture absorption condition, unevenness of a refractive index distribution is generated in the lens, and the spherical aberration largely changes in a lens of the rotational symmetry around the optical axis. This fact is widely known for single objective resin lenses. (Refer to P. 74 of KONICA TECHNICAL REPORT 3, A moisture absorption simulation of a plastic objective lens for an optical disk.)

Regarding also a single collimator resin lens, or a resin lens, constituting a coupling optical system, regardless of its refractive power, its lateral magnification or its numerical aperture, the influence of the refractive index distribution in the lens is presumed in the same manner as in the single objective resin lens.

In fact, in cases of a laser disk, which has a lower recording density compared to a DVD, a light source having a wavelength of approximately 780 nm, and an indefinite conjugation type objective lens having a focal length of 4.5 mm, and having a numerical aperture of 0.50 (an effective aperture is 4.5 mm) are used, and as a collimator lens, a lens having a focal length of 17.0 mm, and a numerical aperture on the light source-side of 0.14, is used.

In both an objective lens and a collimator lens, the diffraction limited performance is obtained by a combination spherical glass lens, respectively composed of a 2-group containing 3-element lens, and a 1-group containing 2-element lens.

In the objective lens, the numeral aperture is large, and the combination spherical glass lens is expensive. Accordingly, a plastic aspherical lens is adopted first of all. Following this lens, as a part of the collimator lens, a plastic aspherical lens of the following specification is adopted.

Wavelength to be used: 780 nm

Focal length: 17.0 mm

Effective aperture: 4.76 mm (5.7 mm)

Numerical aperture on the light source side: 0.14 (0.17)

Lens outer diameter: 7.75

Lens material: acrylic resin (saturated water absorption rate $\alpha=1.0\%$)

Standard of spherical aberration: within 0.031 $\lambda$rms (at NA 0.14)

(Numerical values in parentheses of the above effective aperture and the numerical aperture on the light source side respectively correspond to the case where this lens is combined with the above-described lens, and the amount of tracking is 0.6 mm)

A sectional view of this collimator lens 30 is shown in FIG. 2.

The result of a high humidity test of this collimator lens is shown in FIG. 3.

The test condition was as follows: after the lens had been placed in a constant temperature and constant humidity tank at a temperature of +60° C., and relative humidity of 90% for 120 hours, the condition was restored to an environmental condition of normal temperature and normal humidity, and changes of wave front aberration were measured with an interferometer for 384 hours. The light source of the interferometer was a He-Ne laser (wavelength is 633 nm).

As can be seen from FIG. 3, the spherical aberration component changed by approximately 0.025 $\lambda$rms during dehumidification. When this value is converted into the actual 780 nm wavelength of the light source, the changed amount is 0.02 $\lambda$rms. When the residual spherical aberration of the collimator lens is approximately equal to the limits of the standard, the maximum amount of the spherical aberration reaches 0.051 $\lambda$rms, however, the collimator lens can be used for a laser disk. However, in the optical system for recording/reproducing a high density optical information recording medium such as a DVD, such spherical aberration and its accompanying fluctuations due to humidity absorption are feared, and therefore, a combination spherical glass lens or a single aspherical glass lens, which are expensive, is being used as a coupling optical system.

SUMMARY OF THE INVENTION

In the present invention, an optical system for recording/reproducing an extremely high density optical information recording medium, such as a DVD, comprises a light source, a coupling optical system and an objective lens; and tracking is carried out by moving the objective lens in the direction perpendicular to the optical axis. In this case, even when a part or the entire coupling optical system is composed of plastic lenses, an optical system can be obtained in which the influence of change in humidity can be suppressed to an allowable degree.

In the present invention, an optical system for recording and/or reproducing an optical information recording medium is characterized in that: the optical system is provided with a coupling optical system which is located between a light source and an objective lens, and which has a positive focal length so as to guide a light beam from the light source to the objective lens; and the optical system carries out tracking by moving the objective lens in the direction perpendicular to the optical axis of the coupling optical system, wherein the coupling optical system comprises at least one plastic lens, and the maximum amount of change of the wave front aberration due to water absorption of the plastic lens in the coupling optical system is not larger than 0.02 $\lambda$rms in a numerical aperture corresponding to the maximum tracking.

Accordingly, the plastic lens in the coupling optical system is characterized in that it is composed of materials having a saturated water absorption ratio of not more than 0.5%, concretely made of polyolefine resin or norbornene resin.

In this optical system, the amount of maximum tracking is between 0.1 mm and 0.7 mm, the numerical aperture $NA_0$ on the recording medium side of the objective lens is $NA_0 > 0.52$, and the wavelength $\lambda$ of the light source is not more than 700 nm.

The coupling optical system is preferably composed of a single plastic coupling lens, and the single plastic coupling lens is characterized in that the amount of the maximum change of the wave front aberration of the single coupling lens by water absorption is not more than 0.02 $\lambda$rms in the numerical aperture required at maximum tracking of the objective lens. The single plastic coupling lens is further characterized in that it is made of materials having a saturated water absorption ratio of not more than 0.5%, concretely, made of polyolefine resin or norbornene resin, and the focal length $f_c$ is 12 mm<$f_c$<36 mm.

FIG. 4(a) shows a model of aberration in the case where the coupling optical system has the spherical aberration. In the drawing, the abscissa axis W shows the wave front aberration, and the ordinate axis $\rho$ shows the distance from the optical axis which is normalized by the effective aperture of the objective lens. When the objective lens is placed on the optical axis, the wave front in a range B is used, which is symmetrical about the optical axis, in the wave front emitted from the coupling optical system. However, when the objective lens is moved $\Delta$ by tracking in the direction perpendicular to the optical axis, the wave front in the range C shifted by $\Delta$, as shown in FIG. 4(b), is used.

The wave front in the range C is asymmetrical about the optical axis of the objective lens, and actually, coma is generated.

The wave front W in FIG. 4(a) is expressed as follows:

$$W = A \rho^4 \quad (1)$$

where A is a coefficient.
When the objective lens is moved $\Delta$ by tracking perpendicular to the optical axis, the wave front W is expressed by the following equation.

$$W = A(\rho - \Delta)^4 \quad (2)$$
$$= A\rho^4 - 4A\Delta\rho^3 + \ldots$$

The first term expresses the spherical aberration, and the second term expresses the coma. That is, the equation shows that the coma, which greatly influences the recording/reproducing performance, is generated by tracking.

The spherical aberration component $W_{sa}$ and the coma component $W_{cm}$ in the rms value of the wave front aberration are expressed as follows:

[Equation 1]

$$W_{sa} = \frac{A}{6\sqrt{5}} \quad (3)$$

[Equation 2]

$$W_{cm} = \frac{4A\Delta}{3\sqrt{8}} \quad (4)$$

It is assumed that an objective lens for DVD of the following specification is used in combination with the conventional collimator lens.

Wavelength to be used 635 nm
Focal length 3.36 mm
Effective aperture 4.03 mm
Numerical aperture on the disk-side 0.6
Outer diameter of the lens 5.8 mm
NA on the light source side required for a collimator lens having a focal length of 17.0 mm, is 0.118 when the amount of tracking of the objective lens is 0, and 0.148 when the maximum amount of tracking is 0.5 mm. When $\rho=1$ at NA=0.118, and $\Delta$, corresponding to the maximum amount of tracking, is $\Delta_{max}$, then $$\Delta_{max} = (0.148-0.118)/0.118 = 0.25.$$

The maximum amount of tracking of DVD is assumed to be 0.1–0.7 mm. At present, the eccentricity of the disk is severely controlled, and therefore, the maximum amount of tracking of DVD is acceptable at about 0.2 mm. However, it is presumed that, in the future, the request for recording/reproducing disks of out of the standard is increased, and in this case, the maximum amount of tracking is required to be as large as possible. However, when it is larger than 0.7 mm, the overall size becomes larger, and further, it is difficult to obtain acceptable mechanical characteristics of the tracking mechanism.

When NA is 0.14, the amount of change of the spherical aberration component of the wave front aberration of the collimator lens at dehumidifying is 0.025 $\lambda$rms, and since the spherical aberration component is proportional to the 4th power of NA, the amount of change of the spherical aberration component is 0.0127 $\lambda$rms at a NA of 0.118.

Accordingly, when A is found from the expression (3),

[Equation 3]

$$A = 6\sqrt{5} \times 0.0127 = 0.170$$

From the expression (4), the coma component generated by tracking is

[Equation 4]

$$W_{cm} = 4 \times 0.170 \times \frac{0.25}{3\sqrt{8}}$$
$$= 0.02 \, \lambda rms$$

On the other hand, the standard of the spherical aberration remaining in the collimator lens is not more than 0.0127 λrms under the condition of the wavelength of 635 nm and NA of 0.118.

Accordingly, when tracking is 0.5 mm, a coma of 0.02 λrms is further generated. Due to this, even if there is no coma in the collimator lens and the objective lens, a coma of 0.04 λrms is generated by the remaining spherical aberration and the fluctuation of the spherical aberration of the collimator lens by the moisture absorption and dehumidification. In the optical disk, this coma is generated in the direction of adjoining track, however, in the DVD, because the pitch of the track is highly dense and narrower than that of the laser disk, the collimator lens in the present example shown in FIG. 2 can not be used.

Generally, in the objective lens, because the numerical aperture is large, the coma is generated by the eccentricity of the lens, not depending on the single aspherical lens or the combination lens, and the standard for the coma is generally not larger than 0.03 λrms. Further, sometimes the coma generated in the objective lens is corrected by tilting the objective lens. However, the coma generated by tracking the objective lens can not be corrected because the coma is generated corresponding to the amount of tracking.

In order to suppress the coma, generated corresponding to the maximum tracking amount of less than 0.03 λrms, if the standard for the spherical aberration remaining in the coupling optical system is the same, the coma component $W_{cm, a}$, which is generated when the spherical aberration is fluctuated by $W_{sa, a}$ by moisture absorption and dehumidification, and when tracking is carried out, is required to be less than 0.01 λrms.

From equations (3) and (4),

[Equation 5]

$$W_{sa,a} = \frac{\sqrt{2}}{4\sqrt{5}\,\Delta} \times W_{cm,a} \quad (5)$$

then, $W_{sa, a}=0.0063$ λrms.

This value means that the change of the spherical aberration component, at a numerical aperture of 0.148 corresponding to the maximum tracking amount of 0.5 mm, is 0.016 λrms.

That is, the amount of change of the transient wave front aberration caused by moisture absorption and dehumidification, may be approximately less than 0.02 λrms when considering aberrations other than the spherical aberration, at the numerical aperture corresponding to the maximum tracking amount (for example, 0.5 mm) in the coupling optical system of the optical system for recording/reproducing a high density optical information recording medium, such as a DVD.

A measuring method for the maximum changing amount of the wavefront aberration of the plastic lenses or the lens system including plastic lenses at the numerical aperture corresponding to the time of maximum tracking, will be described below.

After the measuring object has been stored for 168 hours in the constant temperature and humidity tank, under the +60° C. temperature and the 90% relative humidity, the wavefront aberration of the object is measured by an interferometer for 384 hours, after return to the normal temperature of 25° C. and the normal humidity of 50% relative humidity, and the difference between the maximum wavefront aberration and the minimum wavefront aberration is defined as the maximum changing amount of the wavefront aberration.

Herein, the numerical aperture corresponding to the time of maximum tracking means the numerical aperture on the side of light source of the plastic lenses or the lens system including plastic lenses, that is, the numerical aperture corresponding to the maximum luminous flux which can be changed by tracking of the objective lens.

FIG. 5 is an illustration of the overall optical system. Herein, the numerical aperture of a coupling lens (13) corresponding to the time of the maximum tracking, designates "A" in the drawing. In this connection, "B" in the drawing represents the numerical aperture when the tracking amount is "0", and a light beam at the extreme periphery (EP) of the luminous flux corresponding to the numerical aperture, is regulated by an aperture-stop (5) so as to correspond to the numerical aperture $NA_0$ on the side of an information recording medium (7) of an objective lens (16). Herein, a light beam at the extreme periphery of the luminous flux at the time of "A" in the drawing, is equivalent to the case in which a light beam at the extreme periphery of the luminous flux at the time of "B" in the drawing, is vertically shifted by Δmax by tracking, in the drawing.

Measurement of the wavefront aberration is carried out using, for example, Twyman-Green interferometer as shown in FIG. 6. In the measurement of the wavefront aberration, the same wavelength as that of the light source, used for the recording/reproducing optical system of the actual optical information recording medium, is used.

However, when the wavelength of the light source of the interferometer is not equal to that of the light source, used for the recording/reproducing optical system of the actual optical information recording medium, the wavefront aberration can be measured by the following methods: a correction plate CP is inserted between a reference concave mirror CM of the interferometer and the measuring object 13, or the lateral magnification of the measuring object is shifted, so that the same effects as the correction of wavelength is obtained. Further, the result of measurement can also be converted by the optical design simulation.

In order to realize such a recording/reproducing optical system for the optical information recording medium by improving a characteristic of a resin material, a saturated water absorption ratio α may be less than 0.5%. In this connection, it is preferable that α=0% in order to fully satisfy the standard of the remaining spherical aberration component for the coupling lens. As a test method of the saturated water absorption ratio, ASTM (American Society for Testing Materials) D570 (the test condition: a sample is placed in 23° C. water for a week) was employed.

There are various types of resin materials for an optical use with an α of less than 0.5%. As a resin with a relatively small birefringence, polyolefine resin such as Zeonex (trade name) by Nihon Zeon Co. or APEL (trade name) by Mitsui Petrochemical Industries, or a norbornene resin represented by ARTON (trade name) by Japan Synthetic Rubber Co., is preferable.

As an objective lens for DVD use, the following characteristics are required: a working distance of more than 1.0 mm is kept on the disk having the thickness of 0.6 mm and the overall size is as small as possible. Further, for CDs, the minimum moving distance of 1.6 mm is necessary for a 1.2 mm thick disk when the same objective lens is moved along the optical axis for reproduction.

When considering the above case, and in a case where the infinite conjugate type aspherical single objective lens is used for the objective lens, the focal length between 1.8 and 5 mm is required, and it is preferable to set the focal length between 2.4 and 4.5 mm.

The focal length of 1.8 mm corresponds to the case where the necessary minimum moving distance is kept for the exclusive use of DVD, and the focal length of 5 mm corresponds to the case where DVDs and CDs can be interchanged with each other, and the plastic lens is produced by a side gate molding system. When the focal length is longer, the overall size of the optical system becomes larger. Further, when the focal length is shorter, molding using special glass material with a large refractive index becomes necessary.

The lateral magnification $m_r$ of the entire optical system is between $-1/10$ and $-1/4$, and it is more preferable that it be set between $-1/8$ and $-1/5$.

From the above requirement, in the case where the objective lens is an infinite conjugation type, the focal length $f_c$ of the coupling optical system is $$7.2 \; mm < f_c < 50 \; mm,$$

and more preferably, $$12 \; mm < f_c < 36 \; mm.$$

Incidentally, normally, the objective lens is moved along the optical axis for focusing. In this case, when the lateral magnification $|m_0|$ of the objective lens is large, fluctuation of the spherical aberration of the objective lens by focusing becomes a problem, and therefore, $$|m_0| < 1/10 \text{ is preferable.}$$

Accordingly, when $m_0$ is not 0, the lateral magnification $m_c$, viewed from the objective lens side of the coupling optical system, is obtained from the following relationship:

$$m_c = m_0/m_r.$$

DETAILED DESCRIPTION OF THE PREFERRED EMBODIMENT

Examples of the present invention will be described below. The wavelength used in those examples is 635 nm. The symbols in the tables represent the following:

ri: radius of curvature at the vertex of the i-th lens surface from the light source di: surface interval of the i-th lens from the light source ni: refractive index of lens material of the i-th lens from the light source $f_c$: focal length of the collimator lens $f_0$: focal length of the objective lens U: distance between the object and the image of the optical system T: distance to the light source when viewed from the first surface of the optical system.

The shape of the aspherical surface is expressed by a following equation when the vertex of the surface is an origin, the curvature of the vertex is C, a coefficient of the cone is $\kappa$, a coefficient of the aspherical surface is Ai, and an exponent of the aspherical surface is Pi ($\geq 4$).

[Equation 6]

$$X = \frac{C\phi^2}{1 + \sqrt{1 - (1+\kappa)C^2\phi^2}} + \sum_i A_i \phi^{P_i}$$

$$\phi = \sqrt{y^2 + z^2}$$

$$C = 1/r$$

Example 1

As the coupling optical system, a collimator lens 3 by which a luminous flux from the light source 1 is converted into parallel light beams, is adopted, and is combined with an infinite conjugation type objective lens 6.

When $f_c = 25.2$ mm and $f_0 = 3.37$ mm, then $m_r = -1/7.5$, $T = -22.557$ mm, and $U = 35.973$ mm.

| Surface No. | ri | di | ni |
|---|---|---|---|
| 1 cover glass | ∞ | 0.95 | 1.51455 |
| 2 cover glass | ∞ | 1.00 | |
| 3 collimator lens | 161.627 | 1.70 | 1.53830 |
| 4 collimator lens | −14.753 | 5.00 | |
| 5 aperture-stop | ∞ | 0.00 | |
| 6 objective lens | 2.155 | 2.60 | 1.53830 |
| 7 objective lens | −6.594 | 1.566 | |
| 8 transparent substrate | ∞ | 0.60 | 1.58000 |
| 9 transparent substrate | ∞ | | |

Aspherical coefficient

Figure 1:
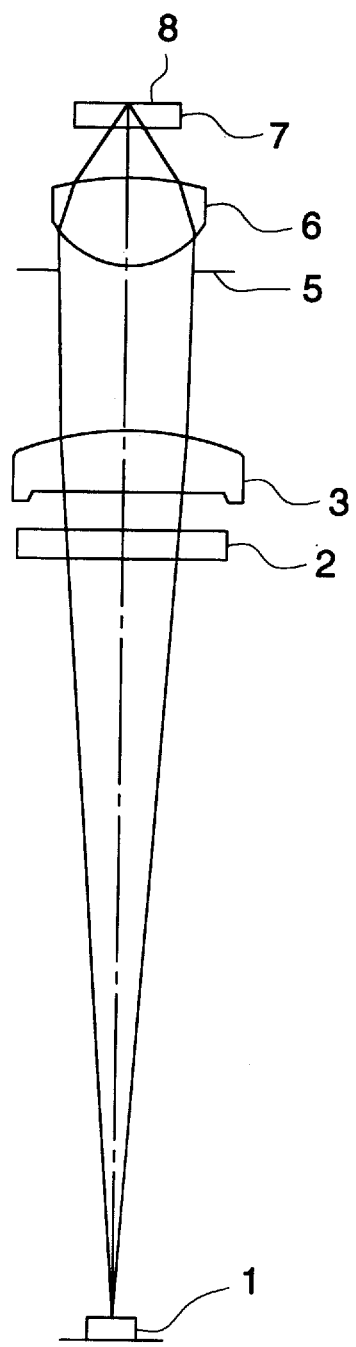
FIG. 1 is a view showing an optical arrangement of Example 1 of an optical system for recording/reproducing an optical information recording medium of the present invention.
Figure 2:
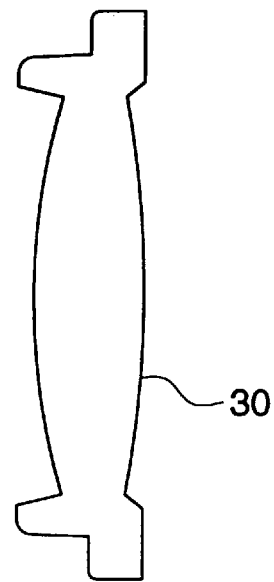
FIG. 2 is a sectional view showing an example of a conventional collimator lens.
Figure 3:
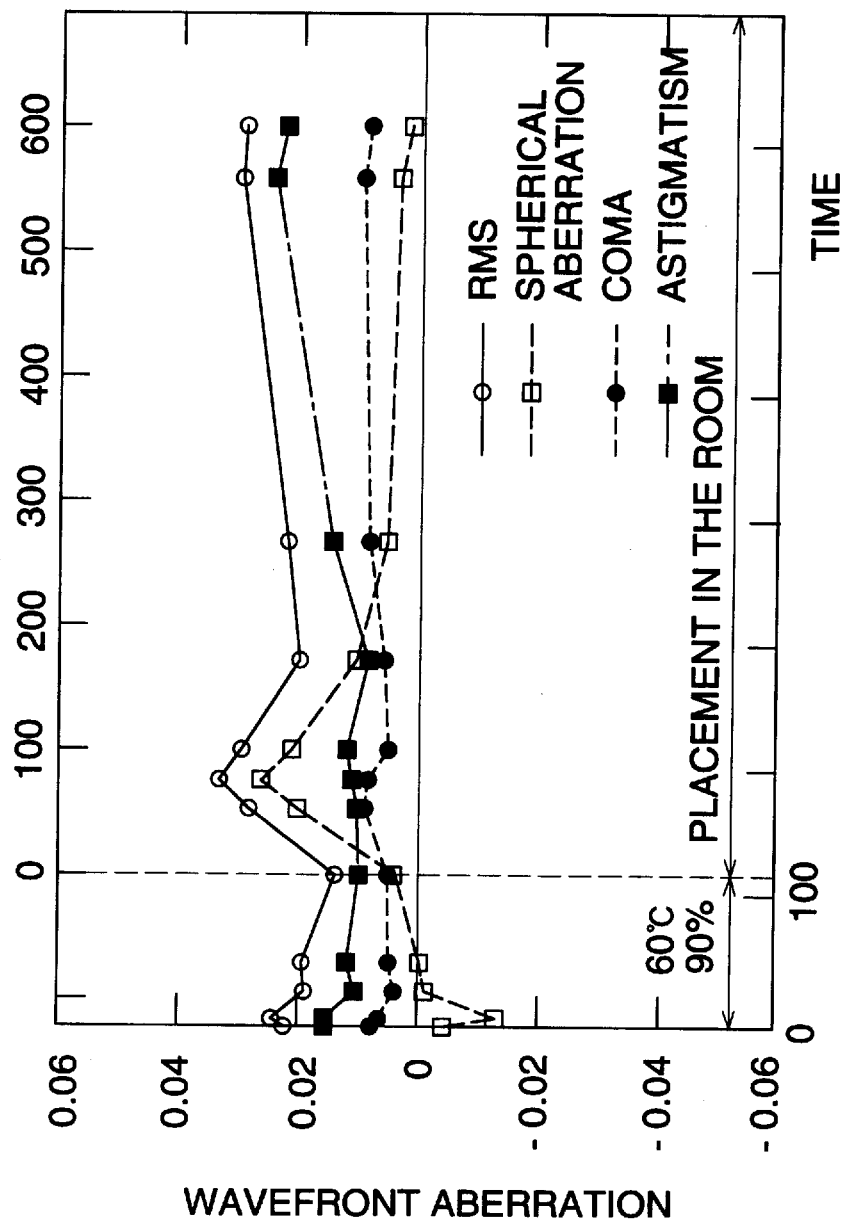
FIG. 3 is a graph showing results of a high humidity test of the collimator lens single body in FIG. 2.
Figure 4:
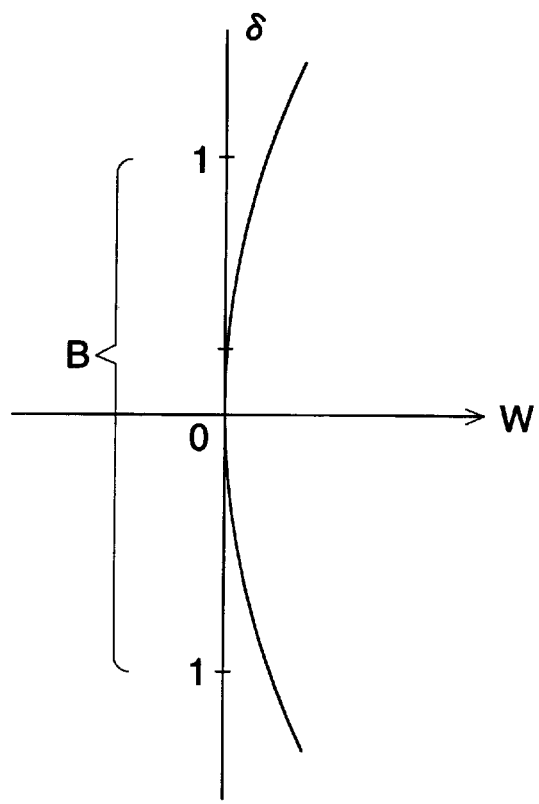
FIG. 4(a) and 4(b) are illustrations showing the influence of tracking in the case where the coupling optical system has spherical aberration.
Figure 4:
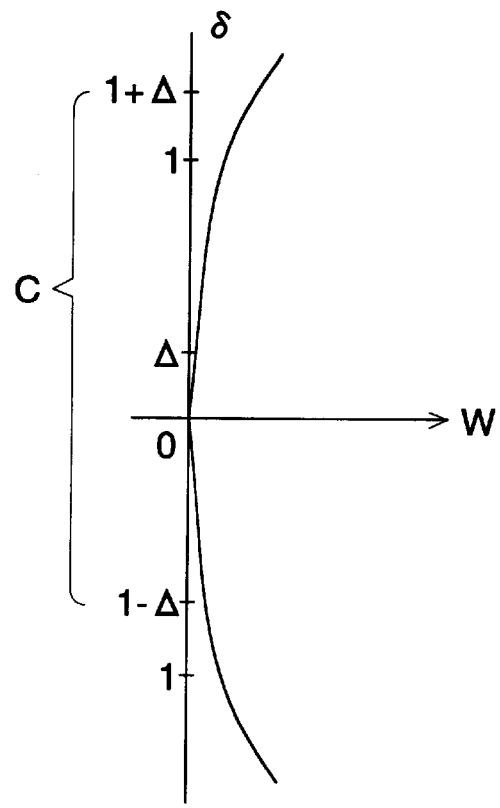
Figure 5:
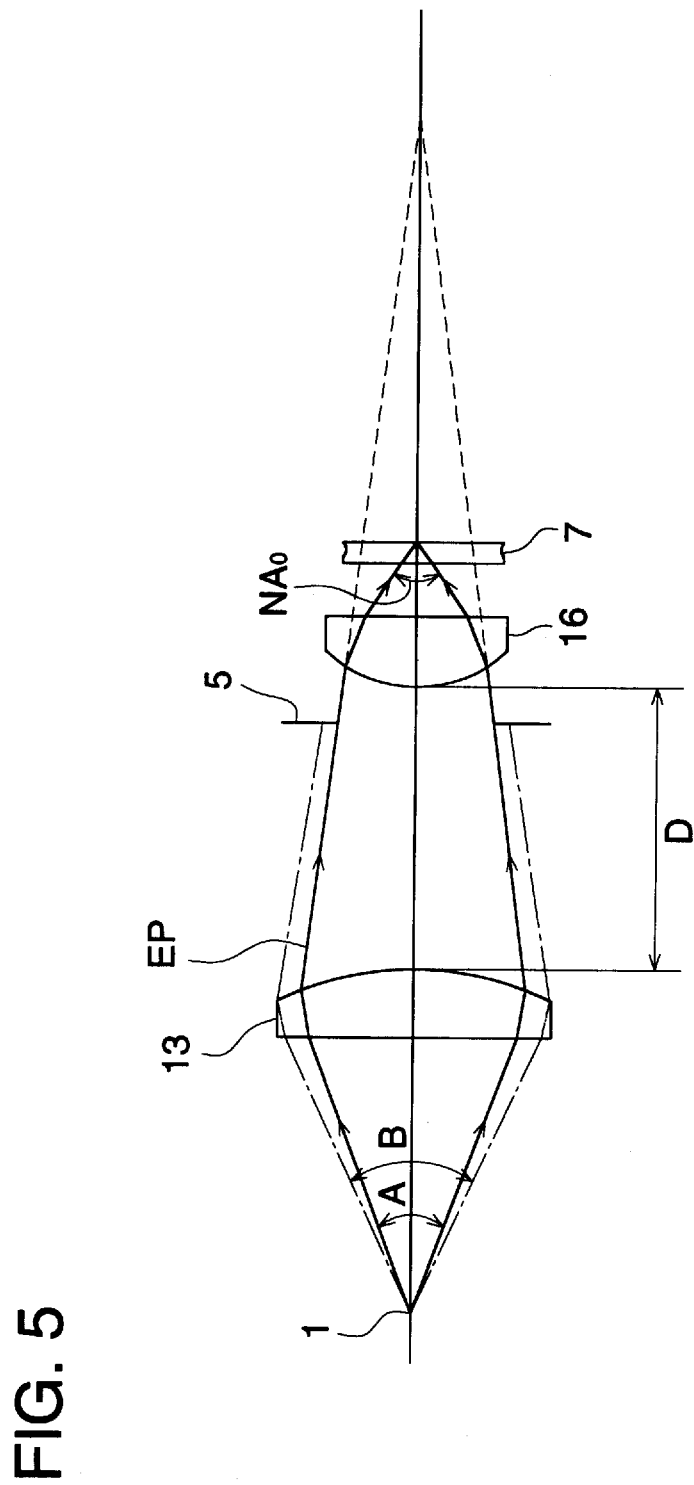
FIG. 5 is a schematic view showing the entire system of an example of the optical system for recording/reproducing the optical information recording medium of the present invention.
Figure 6:
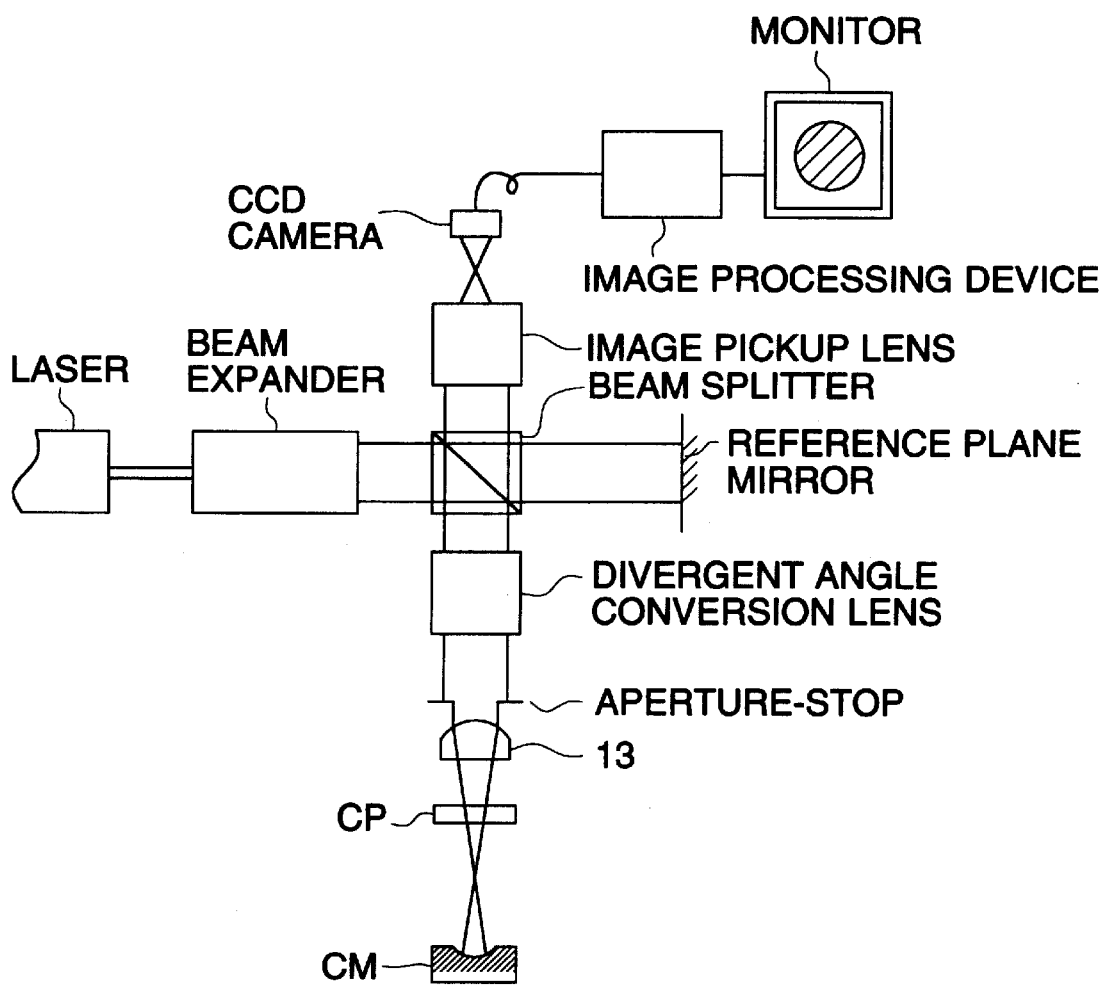
FIG. 6 is a view of an optical path showing a composition of a Twyman-Green interferometer used to measure the wave front aberration.
Figure 7:
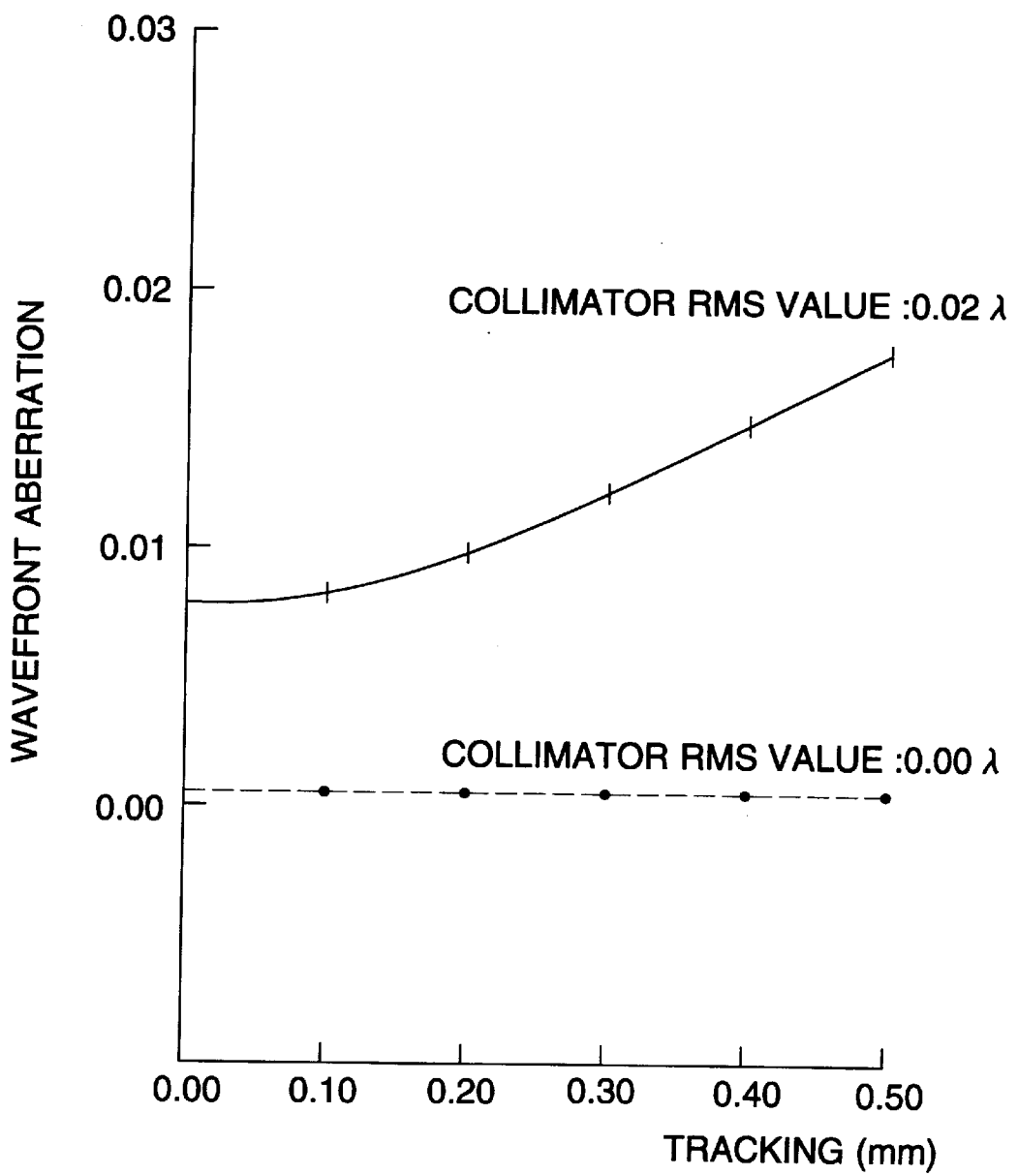
FIG. 7 is a graph showing the change of the wave front aberration by tracking in the optical system of Example 1 of the present invention.

4th surface
 $\kappa = -7.09000 \times 10^{-1}$
6th surface
 $\kappa = -9.90670 \times 10^{-1}$
 $A_1 = 6.06760 \times 10^{-3}$  $P_1 = 4.0000$
 $A_2 = 2.43360 \times 10^{-4}$  $P_2 = 6.0000$
 $A_3 = 6.88550 \times 10^{-6}$  $P_3 = 8.0000$
 $A_4 = -5.62880 \times 10^{-6}$  $P_4 = 10.0000$
7th surface
 $\kappa = -2.73090 \times 10^{-1}$
 $A_1 = 9.23170 \times 10^{-3}$  $P_1 = 4.0000$
 $A_2 = -4.00540 \times 10^{-3}$  $P_2 = 6.0000$
 $A_3 = 8.31010 \times 10^{-4}$  $P_3 = 8.0000$
 $A_4 = -7.33530 \times 10^{-5}$  $P_4 = 10.0000$ A sectional view of Example 1 is shown in FIG. 1. In FIG. 1, a light beam emitted from a light source 1 passes through a cover glass 2, then through a collimator lens 3, to turn into the light beam which is almost collimated, and then it is limited to a prescribed light beam by an aperture-stop 5 and enters an objective lens 6. The light beam entered the objective lens 6 is converged on an information recording surface 8 through a transparent substrate 7. In this optical system, results of a simulation of a change of the wave front aberration are respectively shown in FIG. 7, with respect to the amount of tracking in a case where the collimator lens 3 is made as a design value (non-aberration), and that in the case where the collimator lens itself has a three-order spherical aberration of 0.02 λrms, with respect to an effective aperture of 5.04 mm of the collimator lens, considering an amount of tracking of 0.5 mm.

When the collimator lens 3 has no-aberration, the wave front aberration does not change by tracking. On the other hand, when the collimator lens 3 has a three-order spherical aberration, the wave front aberration is deteriorated by tracking.

Figure 8:
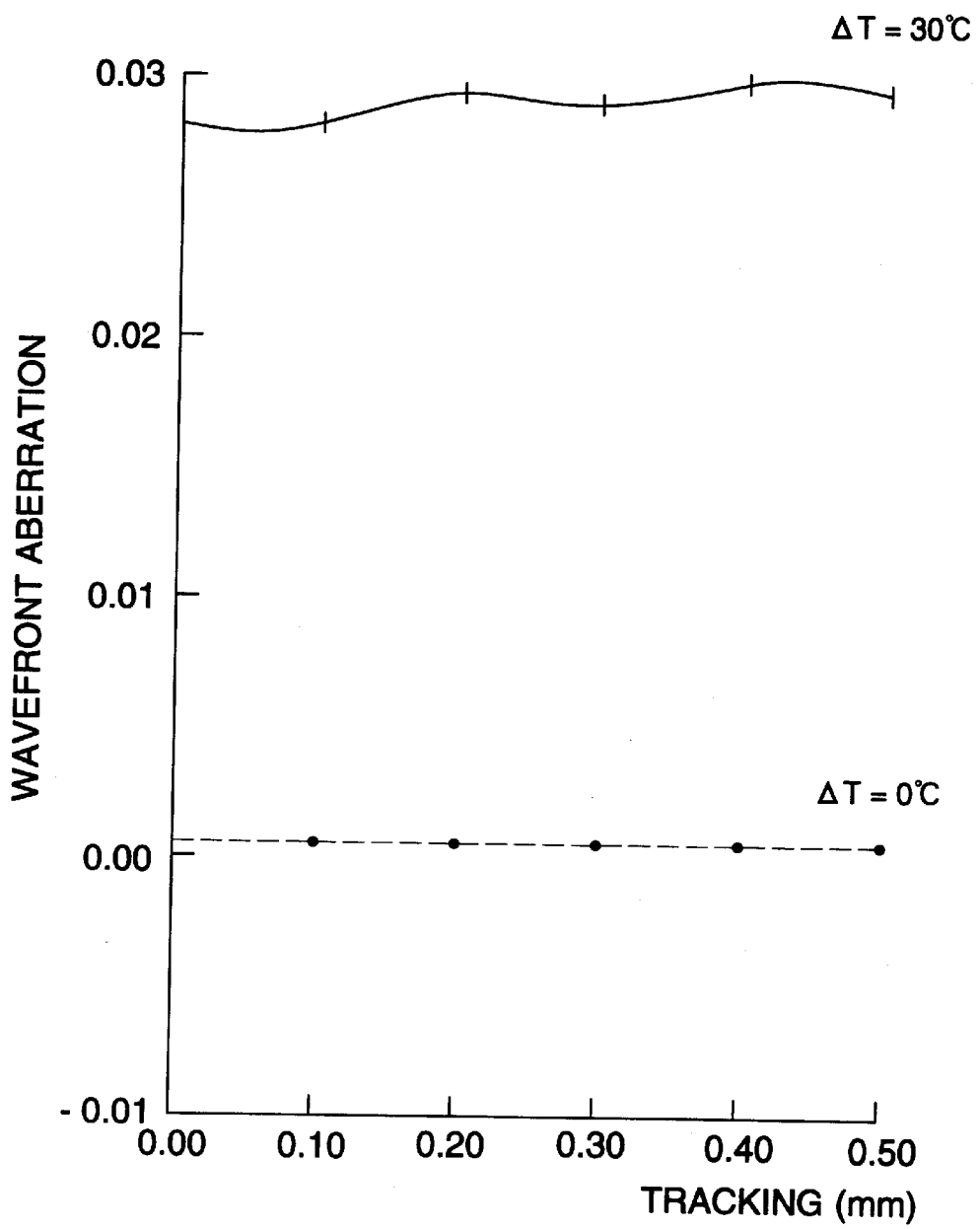
FIG. 8 is a graph showing the change of the wave front aberration with respect to the amount of tracking when the temperature of the optical system rises 30° C. in the optical system of Example 1 of the present invention.

FIG. 8 shows the result of a simulation of a change of the wave front aberration with respect to an amount of tracking when temperature of the optical system is raised by 30° C. (ΔT=30° C.). In this case, since the collimator lens 3 and the objective lens 6 are made of resin, it is assumed that the refractive indices respectively change by −0.0036. Although the spherical aberration of the entire optical system changes, the change of the wave front aberration by tracking is small.

Figure 9:
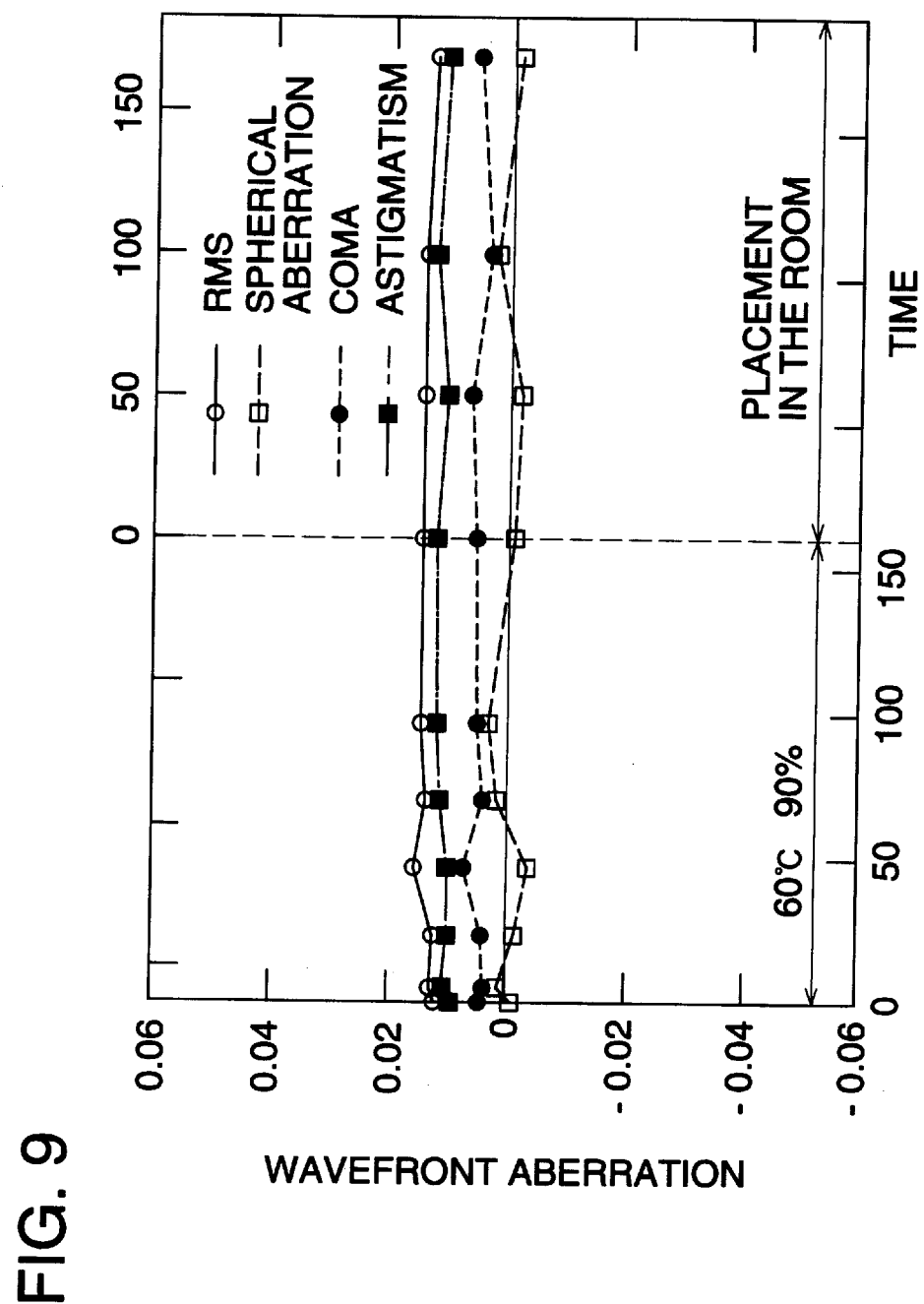
FIG. 9 is a graph showing the change of the wave front aberration by the change of environment in a collimator lens of the optical system of Example 1 of the present invention.

The collimator lens 3 is made of a material having a saturated water absorption ratio α of less than 0.1%. FIG. 9 shows results in which a collimator lens 3 was stored in a constant temperature and humidity tank of +60° C. temperature and 90% RH relative humidity for 168 hours; then its conditions are restored to the normal temperature and humidity environmental condition; and changes of the wave front aberration are measured by an interferometer. Since, as the light source 1, a He-Ne laser with 633 nm wavelength is used, its wavelength is approximately identical to the design work wavelength, obviating conversion. For convenience of the measurement, an aperture-stop matched with the luminous flux at the extreme periphery on the optical axis is used. Under these conditions, the entire wave front aberration and fluctuations of spherical aberration components in the wave front aberration are less than 0.005 λrms, and even if all of fluctuations are assumed to be fluctuations of the spherical aberration, they are less than 0.015 λrms.

As described above and as can clearly be seen in FIGS. 7, 8 and 9, deterioration of the tracking characteristic due to humidity changes is small even in a high density medium such as a DVD, and an optical system having also the excellent temperature characteristic can be realized at lower cost.

Example 2

Figure 10:
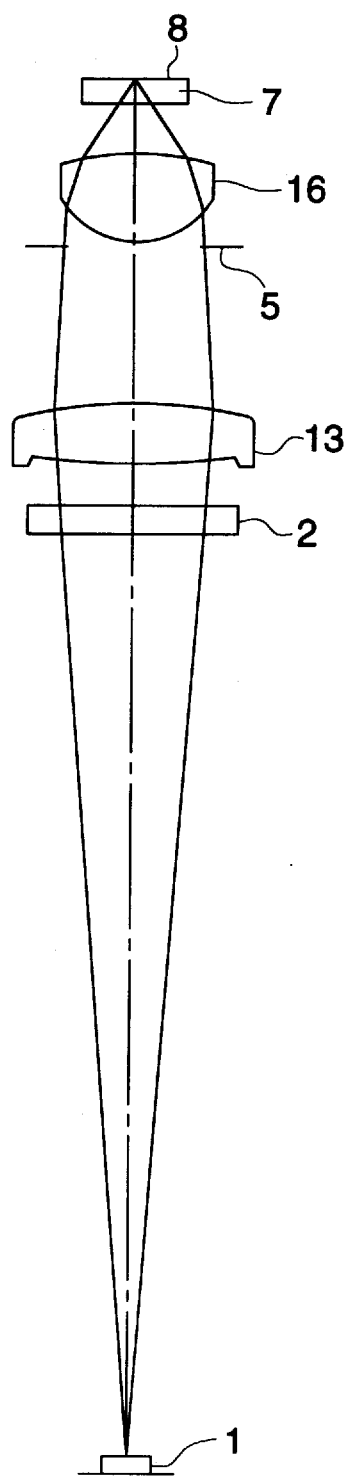
FIG. 10 shows a view of the optical arrangement of Example 2 of the optical system for recording/reproducing the optical information recording medium of the present invention.

As the coupling optical system shown in FIG. 10, a coupling lens 13 is adopted, by which luminous flux from the light source 1 is converted into convergent light beams, and is combined with an objective lens 16 which is conjugate for convergent light beams.

$f_c=18.1$ mm, $f_O=3.80$ mm

A imaging magnification ratio $m_c$, viewed from the objective lens side of the coupling lens 13, and a magnification ratio $m_O$ of the objective lens 16 are respectively given as follows:

$m_c=-0.63$ and $m_O=1/12$, then $m_t=-1/7.5$, T=−26.84 mm, and U=40.18 mm.

| Surface No. | ri | di | ni |
|---|---|---|---|
| 1 cover glass | ∞ | 0.95 | 1.51455 |
| 2 cover glass | ∞ | 1.30 | |
| 3 coupling lens | 23.567 | 1.70 | 1.53830 |
| 4 coupling lens | −16.170 | 4.62 | |
| 5 aperture-stop | ∞ | 0.00 | |
| 6 objective lens | 2.260 | 2.60 | 1.53830 |
| 7 objective lens | −12.703 | 1.57 | |
| 8 transparent substrate | ∞ | 0.60 | 1.5000 |
| 9 transparent substrate | ∞ | | |

Aspherical coefficient

Figure 11:
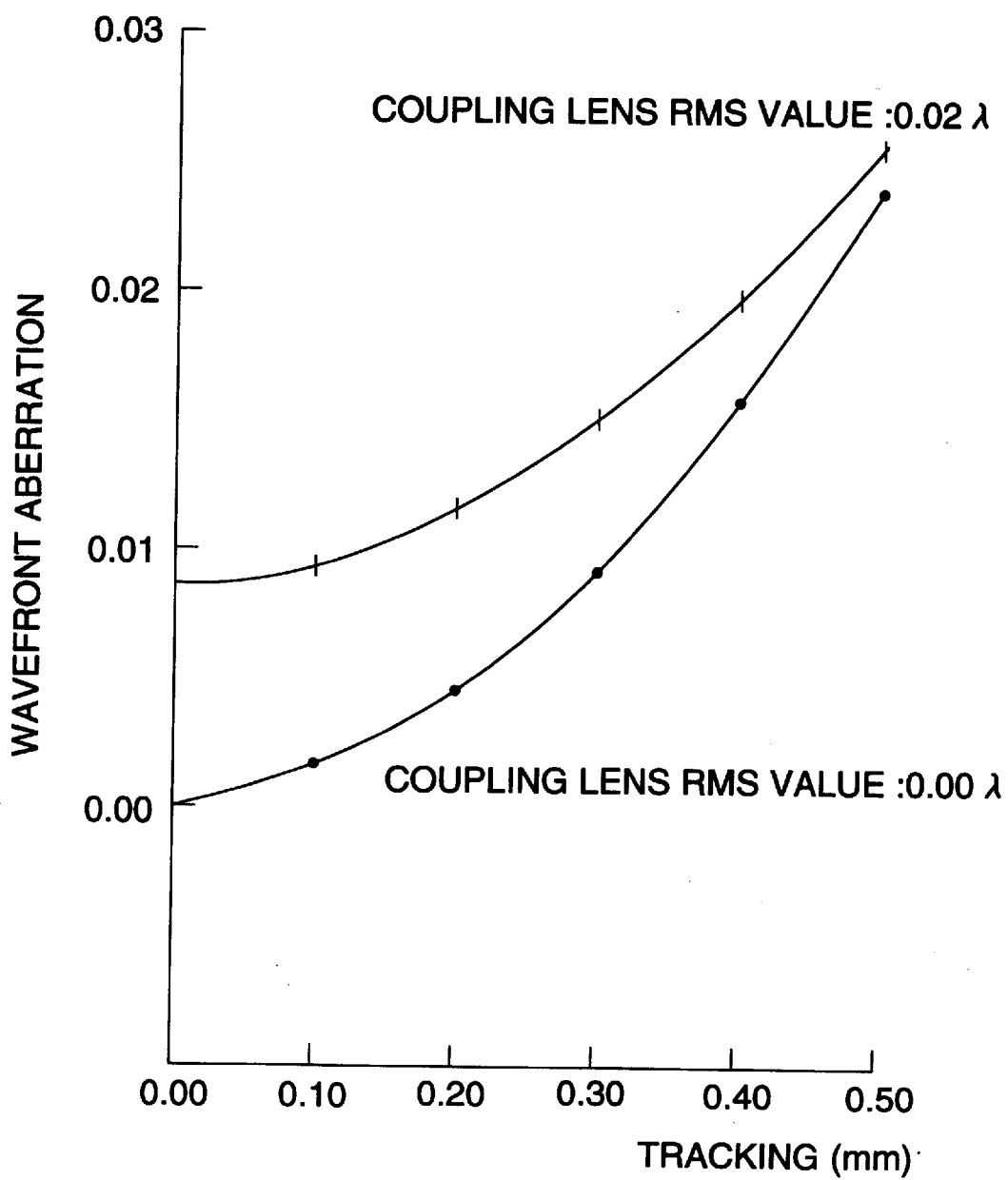
FIG. 11 is a graph showing the change of the wave front aberration by tracking in the optical system of Example 2 of the present invention.

3rd surface
 $\kappa = -4.13770$
4th surface
 $\kappa = -6.11760 \times 10^{-1}$
 $A_1 = 2.60960 \times 10^{-5}$  $P_1 = 4.0000$
6th surface
 $\kappa = -9.01750 \times 10^{-1}$
 $A_1 = 5.40980 \times 10^{-3}$  $P_1 = 4.0000$
 $A_2 = 2.97160 \times 10^{-4}$  $P_2 = 6.0000$
 $A_3 = 1.63600 \times 10^{-5}$  $P_3 = 8.0000$
 $A_4 = -2.71680 \times 10^{-6}$  $P_4 = 10.0000$
7th surface
 $\kappa = -2.25470 \times 10$
 $A_1 = 1.19200 \times 10^{-2}$  $P_1 = 4.0000$
 $A_2 = -4.39840 \times 10^{-3}$  $P_2 = 6.0000$
 $A_3 = 8.74010 \times 10^{-4}$  $P_3 = 8.0000$
 $A_4 = -7.46390 \times 10^{-5}$  $P_4 = 10.0000$ A sectional view of Example 2 is shown in FIG. 10. In FIG. 10, a light beam emitted from a light source 1 passes through a cover glass 2, then through a coupling lens 13, to turn into the light beam which is converged, and then it is limited to a prescribed light beam by an aperture-stop 5 and enters an objective lens 16. The light beam entered the objective lens 16 is further converged on an information recording surface 8 through a transparent substrate 7. In this optical system, the results of a simulation of a change of the wave front aberration are respectively shown in FIG. 11 with respect to the amount of tracking in a case where the coupling lens 13 is made as a design value (non-aberration), and that in the case where the coupling lens itself has a three-order spherical aberration of 0.02 λrms, with respect to an effective aperture of the coupling lens 13, considering an amount of tracking of 0.5 mm.

The wave front aberration changes by tracking also when the coupling lens 13 has no-aberration. This aberration mainly includes off-axial aberration, apparently, which is generated when the light source is shifted from the optical axis of the objective lens 16, and when the offense against sine condition of the objective lens 16 is corrected by a well-known method, astigmatism is a main component. On the other hand, when the coupling lens 13 has a third order spherical aberration, the coma is deteriorated by tracking, in addition to the astigmatism.

Figure 12:
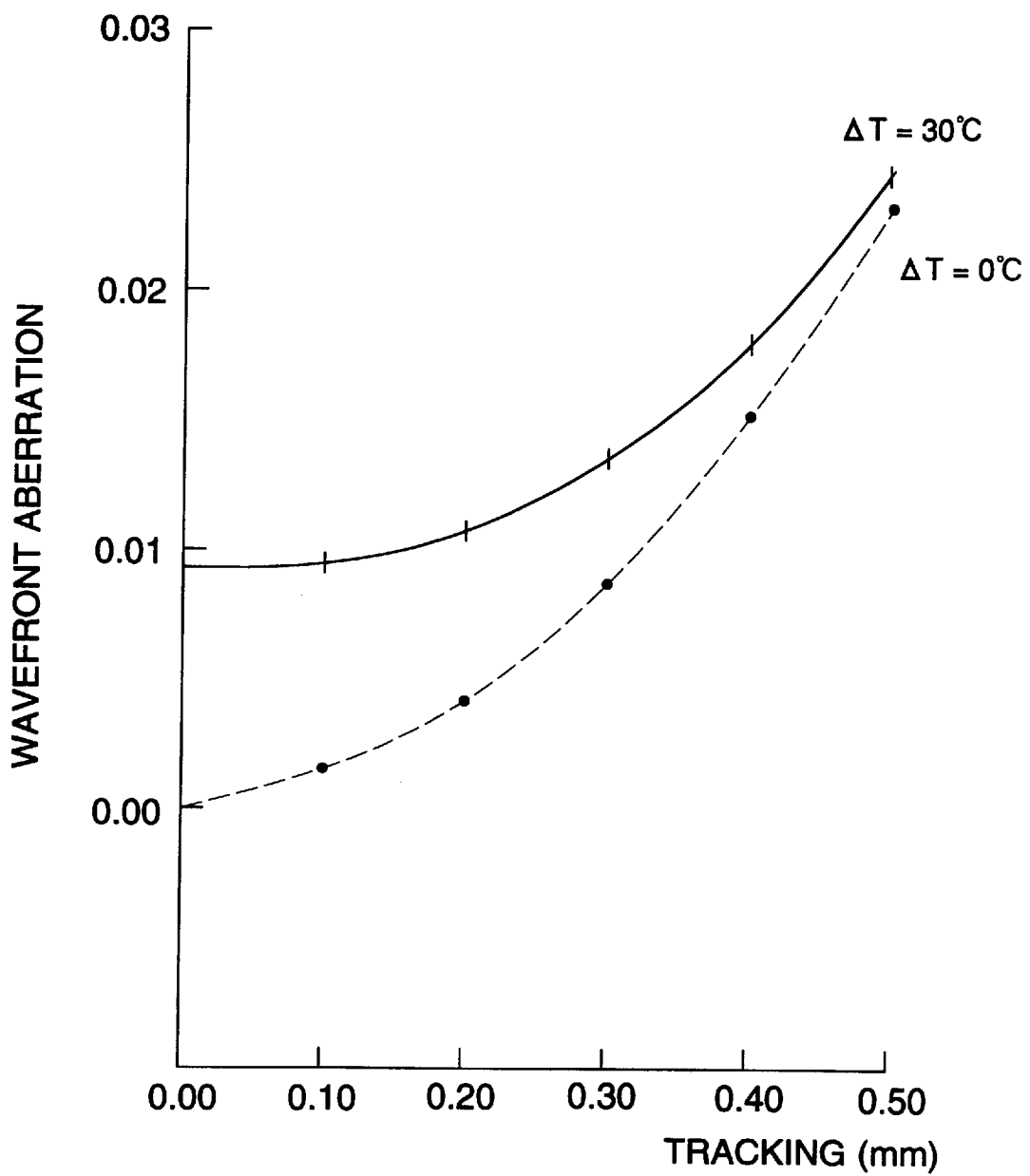
FIG. 12 is a graph showing the change of the wave front aberration with respect to the amount of tracking when the temperature of the optical system rises 30° C. in the optical system of Example 2 of the present invention.

FIG. 12 shows the result of simulation of a change of the wave front aberration with respect to an amount of tracking when temperature of the optical system rises 30° C. (ΔT=30° C.). In this case, because both of the coupling lens 13 and the objective lens 16 are made of resin, it is assumed that their refractive indices respectively change by −0.0036. The spherical aberration of the entire optical system changes, however, the change of the wave front aberration by tracking is small.

Figure 13:
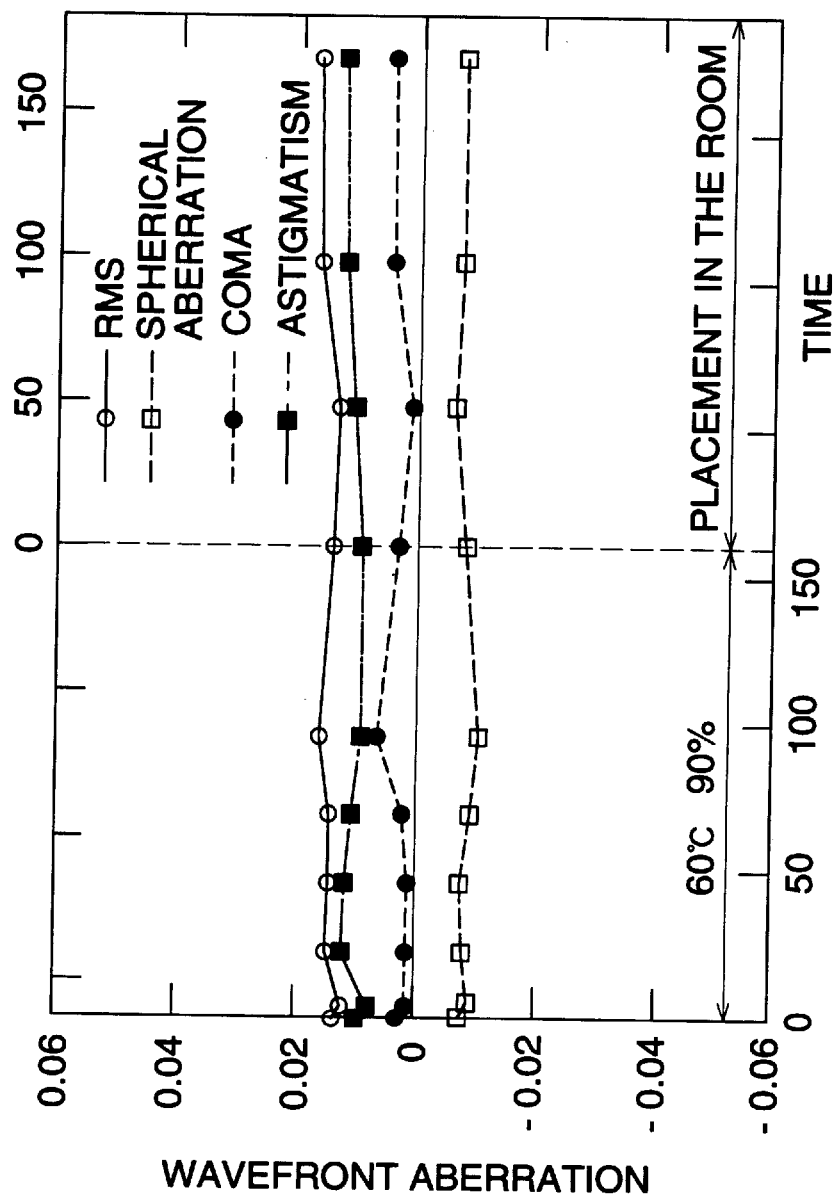
FIG. 13 is a graph showing the change of the wave front aberration due to environmental changes in the coupling lens of the optical system of Example 2 of the present invention.

The coupling lens 13 is made of a material having a saturated water absorption ratio α of less than 0.1%. FIG. 13 shows a result in which a coupling lens 13 was stored in a constant temperature and humidity tank of +60° C. temperature and 90% RH relative humidity for 168 hours; then the lens conditions were restored to normal temperature and humidity environmental condition; and changes of the wave front aberration were measured with an interferometer. Since, as the light source 1, a He-Ne laser with a 633 nm wavelength is used, its wavelength is approximately identical to the design wavelength, so that conversion is obviated. For convenience of measurement, an aperture-stop 5 matched with the luminous flux at the extreme periphery on the optical axis is used. Under these conditions, the entire wave front aberration and fluctuations of spherical aberration component in the wave front aberration are less than 0.005 λrms, and even if all fluctuations are assumed to be fluctuations of the spherical aberration, they are less than 0.015 λrms.

As described above, and as can clearly be seen in FIGS. 11, 12 and 13, deterioration of the tracking characteristic due to humidity changes is small even in a high density medium such as a DVD, and an optical system, having also an excellent temperature characteristic, can be realized at lower cost.

Although in the above examples, cases in which the lateral magnification of the objective lens $m_O=0$ and $m_O>0$, are shown, a case in which $m_O<0$, is the same as above.

That is, a coupling lens may be adopted, by which light beam from the light source is converted into divergent light beam, and is combined with an objective lens which is conjugate for the divergent light beam.

Further, a case in which the coupling optical system is composed of a single lens, is described above. However, when the coupling optical system is composed of a plurality of single lenses, and some of the lenses are made of resin so as to correct the chromatic aberration, the resin lens may satisfy the above conditions.

Further, in order to attain less than 0.02 λrms in the numerical aperture in which the maximum changing amount of the wave front aberration due to water absorption of the plastic lens in the coupling optical system corresponds to maximum tracking, a method to eliminate the influence of the refractive index distribution in the water absorption/dehumidification process by considering the outer shape, thickness, or by coating a material to relax the water absorption on the outer shape or lens surface, other than utilization of resin material with low saturated water absorption ratio, or similar methods, can also be used.

In the recording/reproducing optical system of a type in which the CD is also used as the DVD, by moving the coupling optical system along the optical axis, the present invention can be attained by considering the maximum changing amount of the wavefront aberration when the numerical aperture on the side of the light source of the coupling optical system is large.

As can clearly be seen from examples and characteristic views, according to the present invention, when a plastic lens in the coupling optical system is made of a material in which deterioration of the wave front aberration by water absorption is small, even when the coupling lens and the objective lens are respectively composed of single lenses, deterioration of the wave front aberration by tracking can be suppressed, and thereby, a desirable optical system for reproducing a high density information recording medium such as a DVD, can be obtained.

What is claimed is:

1. An optical system for recording or reproducing information in an optical information recording medium, comprising:

(a) a light source having a wavelength λ thereof;

(b) an objective lens;

(c) tracking means for tracking the objective lens by moving the objective lens in a direction perpendicular to an optical axis of the optical system; and (d) a coupling lens optical system including at least one plastic lens and having a positive focal length, and being provided between the light source and the objective lens for guiding a light emitted from the light source to the objective lens;

wherein a maximum mount of change in a wavefront aberration of the coupling lens optical system in a numerical aperture corresponding to a maximum amount of tracking is 0.02 λrms or less.

2. The optical system of claim 1, wherein a saturation water absorbing rate of the plastic lens included in the coupling lens optical system is 0.5% or less.

3. The optical system of claim 2, wherein the plastic lens included in the coupling lens optical system is made of either polyolefine resin or norbornene resin.

4. The optical system of claim 1, wherein the maximum amount of tracking of the tracking means is 0.1 mm to 0.7 mm.

5. The optical system of claim 1, wherein a numerical aperture $NA_O$ of the objective lens on a side of the optical information recording medium satisfies the following expression, $$NA_O>0.52.$$

6. The optical system of claim 1, wherein the wavelength λ of the light source is 700 nm or less.

7. A coupling lens optical system for use in an optical system for recording or reproducing information in an optical information recording medium, the coupling lens optical system having a positive focal length and being provided between a light source having a wavelength λ and an objective lens which moves for tracking in a direction perpendicular to an optical axis of the optical system for recording or reproducing, for guiding a light emitted from the light source to the objective lens, the coupling lens optical system comprising:

a plastic lens, wherein a maximum amount of change in a wavefront aberration of the coupling lens optical system in a numerical aperture corresponding to a maximum amount of tracking is 0.02 λrms or less.

8. The coupling lens optical system of claim 7, wherein a saturation water absorbing rate of the plastic lens included in the coupling lens optical system is 0.5% or less.

9. The coupling lens optical system of claim 8, wherein the plastic lens included in the coupling lens optical system is made of either polyolefine resin or norbornene resin.

10. The coupling lens optical system of claim 7, wherein a numerical aperture $NA_0$ of the objective lens on a side of the optical information recording medium satisfies the following expression, $$NA_0 > 0.52.$$

11. The coupling lens optical system of claim 7, wherein the wavelength λ of the light source is 700 nm or less.

12. The coupling lens optical system of claim 7, wherein the coupling lens optical system is a plastic single lens.

13. The coupling lens optical system of claim 12, wherein a saturation water absorbing rate of the plastic single lens is 0.5% or less.

14. The coupling lens optical system of claim 12, wherein the plastic single lens is made of either polyolefine resin or norbornene resin.

15. The coupling single lens of claim 12, wherein a focal length $f_c$ of the plastic single lens satisfies the following expression, $$12 \ mm < f_c < 36 \ mm.$$

* * * * *